(12) United States Patent
Knee

(10) Patent No.: US 7,477,691 B1
(45) Date of Patent: Jan. 13, 2009

(54) VIDEO SIGNAL COMPRESSION

(75) Inventor: Michael James Knee, Petersfield (GB)

(73) Assignee: Snell & Wilcox Limited, Middlesex (GB)

( * ) Notice: Subject to any disclaimer, the term of this patent is extended or adjusted under 35 U.S.C. 154(b) by 0 days.

(21) Appl. No.: 09/600,654

(22) PCT Filed: Jan. 22, 1999

(86) PCT No.: PCT/GB99/00228

§ 371 (c)(1),
(2), (4) Date: Oct. 2, 2000

(87) PCT Pub. No.: WO99/38328

PCT Pub. Date: Jul. 29, 1999

(30) Foreign Application Priority Data

Jan. 22, 1998 (GB) ................................ 9801382.4

(51) Int. Cl.
*H04B 1/66* (2006.01)
(52) U.S. Cl. ............................................... 375/240.26
(58) Field of Classification Search ................ 375/210, 375/240.12, 240.13, 240.14, 240.15, 240.16, 375/240.27, 240.28, 240.29, 240.25, 240.26; 348/1, 7, 410.1, 423.1, 845, 419.1, 700; *H04N 3/36; H04B 1/66*
See application file for complete search history.

(56) References Cited

U.S. PATENT DOCUMENTS

| | | | |
|---|---|---|---|
| 4,825,285 A * | 4/1989 | Speidel et al. | 375/240.12 |
| 5,086,488 A | 2/1992 | Kato et al. | |
| 5,142,380 A | 8/1992 | Sakagami et al. | |
| 5,249,053 A | 9/1993 | Jain | |
| 5,343,247 A * | 8/1994 | Vogel | 375/240.16 |
| 5,438,625 A | 8/1995 | Klippel | |
| 5,453,799 A * | 9/1995 | Yang et al. | 348/699 |
| 5,459,515 A * | 10/1995 | Chevance et al. | 348/402.1 |
| 5,467,086 A * | 11/1995 | Jeong | 341/50 |
| 5,512,956 A | 4/1996 | Yan | |
| 5,561,719 A * | 10/1996 | Sugahara et al. | 385/252 |
| 5,629,779 A | 5/1997 | Jeon | |
| 5,642,115 A | 6/1997 | Chen | |
| 5,671,298 A | 9/1997 | Markandey et al. | |
| 5,686,962 A * | 11/1997 | Chung et al. | 375/240.16 |
| 5,699,119 A * | 12/1997 | Chung et al. | 375/240.04 |

(Continued)

FOREIGN PATENT DOCUMENTS

EP 0 597 647 A2 5/1994

(Continued)

OTHER PUBLICATIONS

Re-Codable Video, Massachusetts Institute of Technology, Media Laboratory; Manuela Pereira and Andrew Lippman; pp. 952-956; Nov. 13, 1994; Cambridge, MA.

*Primary Examiner*—Tung Vo
(74) *Attorney, Agent, or Firm*—Michael Best & Friedrich LLP

(57) ABSTRACT

A video signal is analyzed to determine what compression coding decisions would be taken if the video signal were to be MPEG2 encoded. A representation of these coding decisions then accompanies the un-coded video signal for use in a downstream "dumb" encoding process. The coding decisions take the form of an MPEG2 bitstream and are embedded in lsb's of the video.

17 Claims, 3 Drawing Sheets

U.S. PATENT DOCUMENTS

| | | | |
|---|---|---|---|
| 5,748,245 A | 5/1998 | Shimizu et al. | |
| 5,781,788 A * | 7/1998 | Woo et al. | 712/1 |
| 5,790,195 A * | 8/1998 | Ohsawa | 348/419.1 |
| 5,802,218 A | 9/1998 | Brailean | |
| 5,831,688 A | 11/1998 | Yamada et al. | |
| 5,835,147 A * | 11/1998 | Florentin et al. | 375/240.12 |
| 5,930,398 A | 7/1999 | Watney | |
| 5,963,673 A * | 10/1999 | Kodama et al. | 382/239 |
| 5,990,955 A * | 11/1999 | Koz | 375/240.01 |
| 5,990,962 A * | 11/1999 | Ueno et al. | 375/240.16 |
| 5,991,456 A | 11/1999 | Rahman et al. | |
| 6,005,952 A | 12/1999 | Klippel | |
| 6,057,893 A * | 5/2000 | Kojima et al. | 348/700 |
| 6,064,540 A * | 5/2000 | Huang et al. | 360/75 |
| 6,100,940 A * | 8/2000 | Dieterich | 348/700 |
| 6,115,499 A * | 9/2000 | Wang et al. | 382/232 |
| 6,151,362 A | 11/2000 | Wang | |
| 6,163,573 A | 12/2000 | Mihara | |
| 6,269,120 B1 | 7/2001 | Boice et al. | |
| 6,278,735 B1 | 8/2001 | Mohsenian | |
| 6,437,827 B1 | 8/2002 | Baudouin | |
| 6,535,556 B1 * | 3/2003 | Kato et al. | 375/240.05 |
| 6,539,120 B1 | 3/2003 | Sita et al. | |
| 6,570,922 B1 | 5/2003 | Wang et al. | |

FOREIGN PATENT DOCUMENTS

| | | |
|---|---|---|
| JP | 63176049 | 7/1998 |
| WO | WO 95/15659 | 6/1995 |
| WO | WO 95/35628 | 12/1995 |
| WO | WO 98/03017 | 1/1998 |

* cited by examiner

VIDEO SIGNAL COMPRESSION

FIELD OF THE INVENTION

The invention relates to video signal compression.

In an important example, the invention concerns the MPEG-2 video signal compression standard, ISO/IEC 13818-2, though it can be applied to any video compression system that is liable to degradation when coding and decoding are cascaded.

BACKGROUND

There has already been disclosed (WO-A-9535628) the use of a signal which accompanies an MPEG bitstream and which carries information about the bitstream for use in a downstream process, for example, the re-encoding of a decoded MPEG picture. This signal is provided in parallel and is sent along an appropriate side channel to accompany a decompressed signal from a compression decoder to a subsequent encoder.

Where equipment has been specifically designed for use with such a signal, considerable advantage can be gained and many of the problems previously associated with cascaded coding and decoding processes are removed or ameliorated by using in a downstream coding process, key information concerning upstream coding and decoding.

In WO-A-9803017, there are disclosed techniques which extend these advantages, in part or in whole, to arrangements which include equipment not specifically designed for use with such a signal. Specifically, these techniques include embedding the information signal in the video signal so that it can pass transparently through a video pathway.

It is an object of this invention to provide improved apparatus and processes which offer benefits not just in a cascaded recoding operation but primary coding operation.

SUMMARY OF THE INVENTION

Such a primary coding operation will usually be applied to a video signal which has not previously been compressed. The possibility is included, however, of a "primary" coding operation on a video signal which has been compressed but without advantage having been taken of any of the techniques disclosed in either of the above referenced documents.

Accordingly, the present invention consists, in one aspect, in a video signal process comprising the steps of analysing a video signal and taking compression coding decisions; forming a representation of the coding decisions for passage with the video signal along a video pathway and, downstream of the video pathway, compression encoding the video signal in accordance with said coding decisions.

In another aspect, the present invention consists in compression pre-processing apparatus, comprising means for analysing a video signal and taking compression coding decisions; means for processing the coding decisions and means for outputting the processed coding decisions for passage with the video signal along a video pathway.

The coding decisions may include the following information: picture dimensions; frame rate; picture structure (frame-coded or field-coded); picture type (I, P or B): whether macroblocks are intra-coded or use prediction; whether forward, backward or bi-directional prediction is used; motion vectors; transform type; quantizer visibility weighting matrices; quantizer step; bit rate and buffer state of a downstream decoder.

In this description, the term information bus is used to represent information relating to a coding operation, which information accompanies a decoded signal, a partially decoded signal or a yet-to-be-coded signal. More details can be found with reference to U.S. Pat. No. 6,285,716 (WO-A-9535628). The information bus is preferably embedded within a video signal as disclosed in WO-A-9803017. The content of U.S. Pat. No. 6,285,716 is herein incorporated by reference.

BRIEF DESCRIPTION OF THE DRAWINGS

The invention will now be described by way of example with reference to the accompanying drawings, in which:—

Turning to FIG. 1, an input video signal which has not previously been encoded is presented at input terminal 100 and passes to an MPEG2 encoder 102. This encoder takes one of the forms disclosed in WO-A-9535628 and has in addition to the MPEG output, an information bus output on which appear a representation of the coding decisions taken in the encoder. These coding decisions may include the following information: picture dimensions; frame rate; picture structure (frame-coded or field-coded); picture type (I, P or B): whether macroblocks are intra-coded or use prediction; whether forward, backward or bi-directional prediction is used; motion vectors; transform type; quantizer visibility weighting matrices; quantizer step; bit rate and buffer state of a downstream decoder.

The information bus then joins the input video signal for passage in tandem along a video pathway. It should be noted that the video signal at the output has undergone no processing, beyond delay in an appropriate compensating delay 104.

There are a variety of preferred ways in which the information bus can accompany the video signal. For example, the information bus can be carried in the least significant bit of the colour-difference part of a 10-bit ITU-R Rec. 656 signal, within the active video region only. This provides a raw bit-rate of 10.368 Mbit's for the information bus. Care will be taken to ensure that the presence of this additional information does not cause visible impairments to the video signal and that studio equipment quoted as '10 bits' is indeed transparent to all ten bits of the signal when no mixing or other processing is being performed. In other implementations, the information bus might be transported in the 9th or 8th colour-difference bit, in the 10th, 9th or 8th luminance bit or in any combination of the above. Use of the 8th bit would also be appropriate for systems using earlier versions of the Rec. 656 standard where only 8-bit representation is available.

DETAILED DESCRIPTION

Another example is an extension of the above approach, in which any part of the digital video signal (not just the least significant bit) is modified by adding the information bus data to the video in such a way that a downstream MPEG coder would be unaffected.

It is also possible to carry the information bus in an ancillary data channel carried in the blanking periods of the Rec. 656 signal. It would be necessary to ensure that studio equipment passed this information unchanged when no mixing or other processing was being performed.

A still further example is to send the information bus as an AES/EBU digital audio channel. This would be passed through a spare channel in the audio path of the studio equipment. It would be necessary to ensure that switching of that particular audio channel would be performed along with the video switching, even though the main audio channel(s) might be switched independently of the video.

Figure 2:
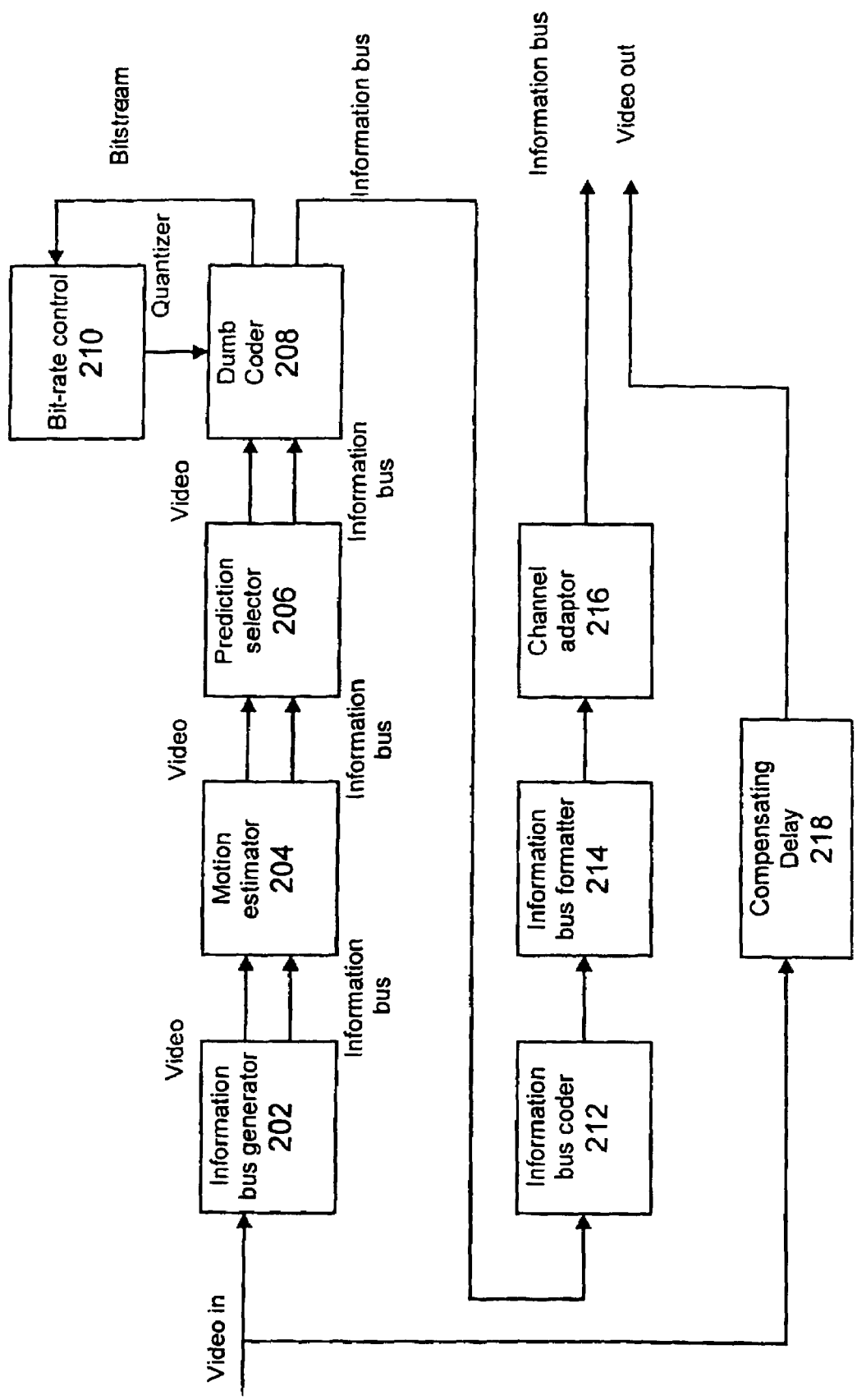
FIG. 2 is a block diagram of a compression pre-processor according to a second embodiment of this invention.

FIG. 2 shows a more detailed configuration of a compression pre-processor according to the present invention. An information bus generator 202 receives the input video signal and generates a 'skeleton' information bus containing picture, GOP and sequence rate information relating to the input video signal, for example, picture size, aspect ratio, field/frame coding type and picture type. The video signal and the skeleton information bus are passed to a motion estimator 204. This generates candidate motion vectors which are placed on the Information Bus. A prediction selector 206 receives both the video signal and the information bus and selects between the different candidate motion vectors. It also selects which prediction mode (field, frame, forward, backward, bi-directional etc.) is to be used for each macroblock. The prediction selector 206 further performs inter/intra selection and DCT type selection.

The information bus at the output of the prediction selector 206 contains all the decisions necessary for the creation of an MPEG bitstream apart from those relating to quantization. These are provided as follows.

A "dumb" coder 208 operates on the video signal, guided by the coding decisions represented in the information bus. A bit rate controller 210 receives the coded bitstream and controls the quantization in the dumb coder to bring the output bit rate to a notional bit rate representing the probable output rate of a downstream encoder. The dumb coder then places on the information bus the quantizer information employed to generate a bitstream at the desired notional bit rate So far, what has been described in FIG. 2 is identical to an MPEG coder, based on the information bus as shown in the referenced prior publications. In this application, however, the bitstream is not used and only the final information bus appears at the output of the coder 208.

This information bus is then processed using techniques described in WO-A-9803017. Briefly, the information bus passes to an information bus coder 212 which performs variable length coding, packetisation and allocation of time stamps. This represents a convenient form of compression using, essentially, the MPEG2 syntax. Indeed, the information bus in one form can be viewed as the MPEG2 bitstream minus the DCT coefficients.

There are various possibilities for the format of an information bus signal, according to its timing relationship with the video signal it accompanies. Formatting is carried out by the information bus formatter 214. Examples of possible formats for the information bus signal are as follows:

(i) A fixed-bit-rate signal but containing a variable number of bits per picture and transmitted with no regard for synchronisation to the video signal. In practice, the signal could have a variable bit-rate but could be made to occupy a fixed-bit-rate channel by the use of stuffing bits.

ii) A fixed or variable-bit-rate signal which is re-ordered (from bitstream order to display order within the GOP structure) and time-shifted so that the information bus for each picture is co-timed with the video signal for that picture.

iii) A mixture of the two, in that the information bus itself is asynchronous but a small slot is reserved for some picture-locked data; this would carry, for example, duplicates of time_code and picture_type.

iv) A fixed-bit-rate signal which is re-ordered and time-shifted as described in the second option above, but additionally arranged so that the macro-rate information for each macroblock is co-timed with the video signal corresponding to the macroblock.

Figure 1:
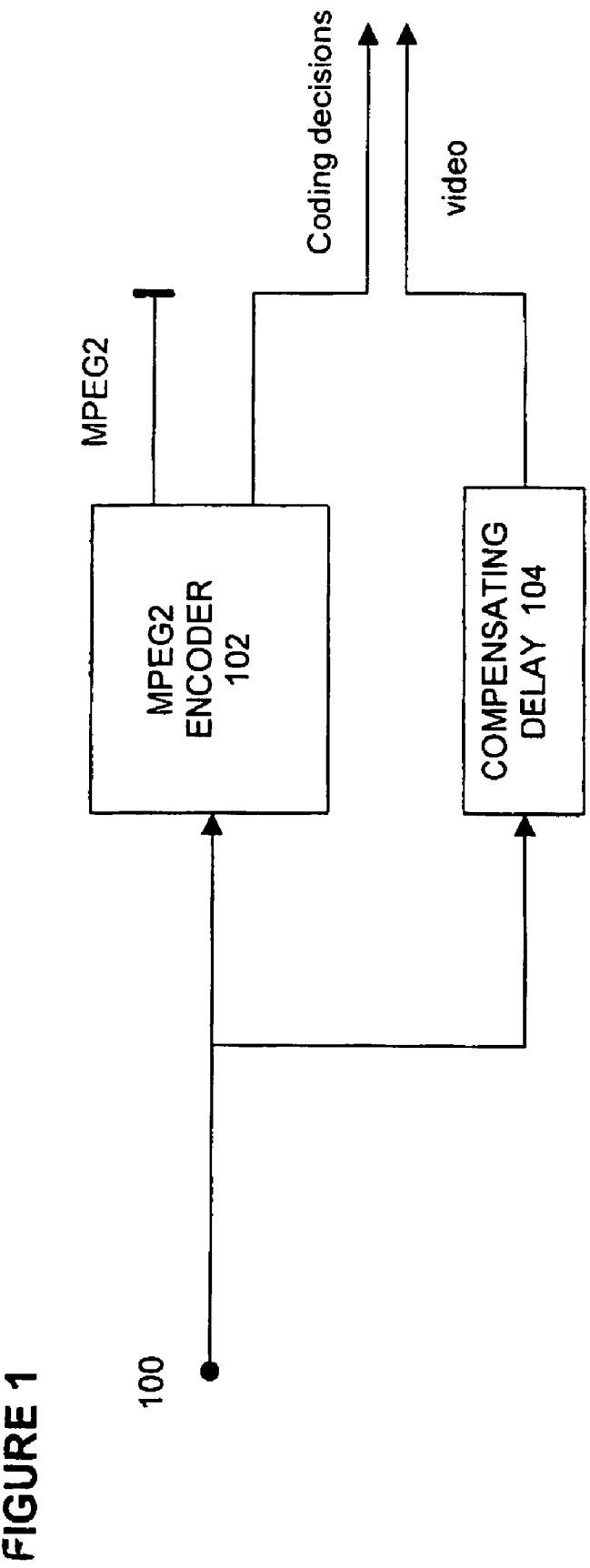
FIG. 1 is a block diagram of a compression pre-processor according to one embodiment of this invention.

The formatted information bus then passes to a channel adapter 216, which adapts the information bus to accompany the video signal (which has been delayed in compensating delay 218) in any of the ways described by way of example with reference to FIG. 1. Thus, in a preferred example, the channel adapter 216 embeds the formatted information bus in the least significant bit of the colour-difference part of a 10-bit ITU-R Rec. 656 signal, within the active video region only.

In a modification to the arrangement illustrated in FIG. 2, two or more dumb coders 208 and associated bit rate controllers 210 could work in parallel, each at a different bit rate covering the range of likely future requirements. The quantizer information generated at each bit rate could be recorded in the information bus.

In a further alternative, the bit rate controller 210 could be removed and the dumb coder or coders 208 could work with a fixed quantizer or quantizers. The resulting numbers of bits generated for each macroblock could then be recorded in the output information bus.

Figure 3:
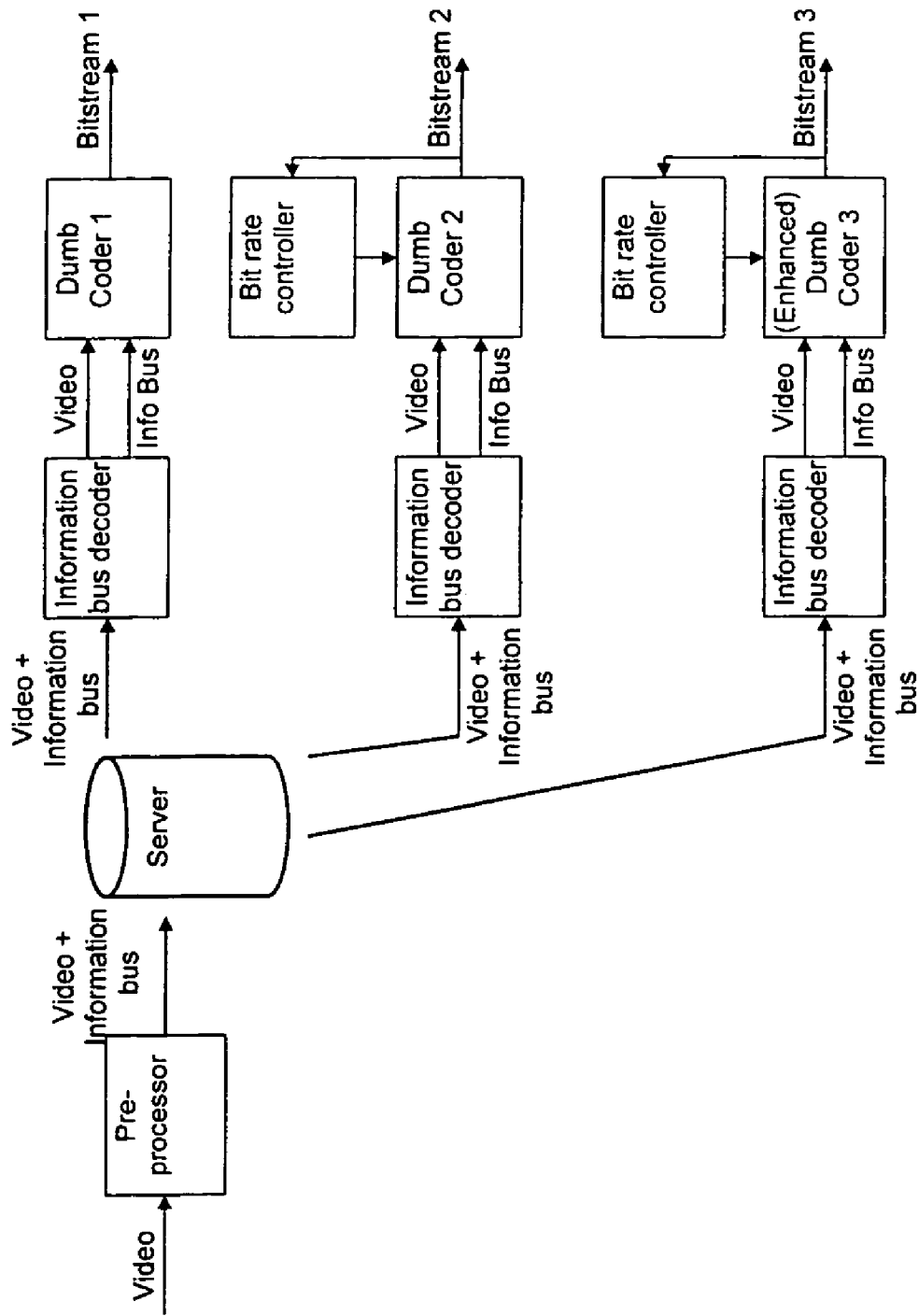
FIG. 3 is a block diagram illustrating three alternative server-based processes according to this invention making use of the information provided by the pre-processor of FIG. 1 or FIG. 2.

FIG. 3 shows how a pre-processor according to this invention might be used in conjunction with a server designed for uncompressed video signals. The pre-processor works as described above to add an information bus to a digital video signal. The resulting video+ information bus signal is written onto a server. There are then shown three examples of how the signal might be used downstream to produce bitstreams.

In each example, the signal is read from the server and sent to an Information Stream decoder which passes the resulting video and Information Bus signals to a dumb coder.

In the first example, dumb coder 1 simply slaves to the incoming video and information bus signals and produces a bitstream at the bit rate (or a chosen one of the bit rates) generated by the pre-processor.

In the second example, dumb coder 2 works at a new bit rate. The quantizer information in the information bus is ignored and is replaced by quantizer information calculated by the local bit rate controller.

In the third example, (enhanced) dumb coder 3 makes use of both the local bit-rate controller and the quantizer or bit-count information decoded from the information bus to improve the performance of the encoder. Effectively, the known benefit of two-pass encoding is obtained, that is to say pre-analysis and a second pass through the bit rate control process.

Either of the second two configurations could be used as part of a bitstream switch or other bitstream processor in which it is necessary to control the bit rate and the occupancy of the coder buffer.

Whilst the use of an information bus which is effectively the MPEG stream minus the DCT coefficients, is extremely convenient, other options exist for representing the coding decisions. A range of formats could be employed and various compression techniques employed. In addition to the coding decisions, useful statistical information from the coding process can also be carried.

Note that the present invention is not confined to MPEG2 compression. It could be used with a wide variety of compression technique, or even with mixtures of techniques, although in this case the processing of the decoded information bus would be significantly more complicated, as it would involve the re-interpretation of coding mode information for a different compression scheme.

It should be understood that this invention has been described by way of examples only and a variety of further modifications are possible without departing from the scope of the invention.

The invention claimed is:

1. Compression pre-processing apparatus, comprising
   a coder for analysing an input video signal at a picture rate and at a macroblock rate and taking compression coding decisions for the input video signal, the compression coding decisions including picture rate coding decisions and macroblock rate coding decisions for the input video signal, said macroblock rate coding decisions including motion vectors;
   a processor for processing the coding decisions; and
   an output for outputting, from the compression pre-processing apparatus, the processed coding decisions so that the processed coding decisions are integrated with the input video signal for passage along a video pathway, wherein the input video signal which is passed along the video pathway with the processed coding decisions undergoes no processing other than delay.

2. Apparatus according to claim 1, wherein said processor for processing the coding decisions provides a representation of the coding decisions in the form of a compressed video bit stream lacking transform coefficients.

3. A video signal process comprising the steps of: in a compression coding step,
   analyzing an input video signal at a picture rate and at a macroblock rate and taking compression coding decisions including picture rate coding decisions and macroblock rate coding decisions for the input video signal, said macroblock rate coding decisions including motion vectors;
   forming a representation of the coding decisions;
   outputting said representation from the compression coding step;
   integrating the representation of the coding decisions with the input video signal;
   passing the integrated representation of the coding decisions and input video signal along a video pathway; and
   downstream of the video pathway, compression encoding the input video signal in accordance with said coding decisions, wherein the input video signal which is passed along the video pathway with the representation of the coding decisions undergoes no processing other than delay.

4. A process according to claim 3, wherein said analysis comprises the generation of candidate motion vectors.

5. A process according to claim 4, wherein said analysis comprises the selection for each macroblock of the picture of a motion vector from said candidate motion vectors.

6. A process according to claim 5, in which said analysis comprises the selection of a macroblock prediction mode.

7. A process according to claim 3 wherein said analysis includes a bit rate control and the taking of quantizer decisions appropriate to maintenance of a selected bit rate.

8. A process according to claim 5 wherein plural bit rates are selected and plural quantizer decisions are taken.

9. A process according to claim 3 wherein said representation of the coding decision comprises an information bus in which the coding decisions are represented in the same format as they are represented in the compressed bitstream which is the output of said downstream compression coding operation.

10. A process according to claim 9, wherein said analysis generates information relating to picture size and type.

11. A video signal process comprising the steps of in a compression coding step,
    passing an input video signal along a first pathway;
    analyzing the input video signal and taking compression coding decisions which are capable of enabling a downstream encoder to slave to the coding decisions and compression encode the input signal at a bit rate determined by the coding decisions;
    forming a representation of the coding decisions;
    outputting said representation from the compression coding step;
    integrating the representation of the coding decisions with the input video signal from the first pathway to create an integrated signal;
    passing the integrated signal along a second pathway; and
    downstream of the second pathway compression encoding the input video signal in accordance with said coding decisions, wherein the input video signal which is passed along the first pathway undergoes no compression processing.

12. A video signal process according to claim 11, wherein said input video signal is modified to carry said representation in one or more of the least significant bits of the input video signal.

13. A video signal process according to claim 11, wherein said input video signal is modified to carry said representation in a data channel of the input video signal.

14. A video signal process according to claim 11, wherein said input video signal is modified to carry said representation in an audio channel of the input video signal.

15. Compression pre-processing apparatus comprising:
    a coder for analysing an input video signal and taking compression coding decisions which are capable of enabling a downstream encoder to slave to the coding decisions and compression encode the input signal at a bit rate determined by the coding decisions;
    a processor for processing the coding decisions; and
    an output for outputting, from the compression pre-processing apparatus, the processed coding decisions integrated with the input video signal to create an integrated signal, the output passing the integrated signal along a video pathway, wherein the input video signal which is passed along the video pathway with the processed coding decisions undergoes no compression processing.

16. A video signal process comprising the steps of:
    passing an input video signal along a first pathway;
    in a compression coding step and along a second pathway, analyzing the input video signal and taking compression coding decisions which contain all the decisions necessary for the creation of a compressed bitstream apart from those decisions relating to quantization;
    forming a representation of the coding decisions;
    outputting said representation from the compression coding step and integrating the representation with the input video signal from the first pathway; and
    downstream of the second pathway compression encoding the input video signal in accordance with said coding decisions, wherein the input video signal which is passed along the first pathway undergoes no compression processing.

17. Compression pre-processing apparatus, comprising a coder for analysing an input video signal and taking compression coding decisions which contain all the decisions necessary for the creation of a compressed bitstream apart from those decisions relating to quantization; a processor for processing the coding decisions and an output for outputting, from the compression pre-processing apparatus, the processed coding decisions for passage with the input video signal along a video pathway, wherein the input video signal which is passed along the video pathway with the processed coding decisions undergoes no compression processing.

* * * * *